July 7, 1959 J. P. PARKER 2,893,584
COMBINATION TIP PROTECTOR AND SHOCK ABSORBER FOR VACUUM BOTTLES
Filed Sept. 19, 1955

INVENTOR
JOHN P. PARKER
BY
ATTORNEYS

United States Patent Office 2,893,584
Patented July 7, 1959

2,893,584

COMBINATION TIP PROTECTOR AND SHOCK ABSORBER FOR VACUUM BOTTLES

John Paul Parker, Toronto, Ontario, Canada, assignor, by mesne assignments, to The American Thermos Products Company, a corporation of Ohio Application September 19, 1955, Serial No. 535,184

5 Claims. (Cl. 215—13)

This invention relates to vacuum bottles and in particular to a combination tip protector and shock absorber for the glass filler of vacuum bottles.

Vacuum bottles, as commonly in use today, consist of an outer casing, usually of thin sheet metal, within which is mounted a glass vacuum filler. Throughout this specification and in the claims the term "vacuum bottle" will be intended to mean the completed assembly including the outer casing and the filler while the term "glass filler," "filler," or "double-walled evacuated filler" will be intended to mean the glass vacuum container which lies within the outer casing and which actually contains the material stored in the vacuum bottle.

The glass filler is normally resiliently supported in the outer casing by means of a shock-absorbing collar around its neck and by means of a resilient supporting member lying between the base of the filler and the end closure of the outer casing.

A conventional supporting member for the base of the glass filler consists of a metal strip bent to form a central web having legs at each end thereof. The legs bear against the end closure of the outer casing and the central web is provided with an aperture through which the exhaust tip of the filler projects. A resilient seat surrounds the aperture in the central web and bears against the base of the filler to provide support and to hold it in spaced relationship to the end and side walls of the outer casing. The flexing of the strip provides the necessary resiliency in a supporting member.

Another supporting member which has been used consists of a vertically extending cylinder of polyethylene on the upper edge of which the base of the glass filler is seated. Lugs extending laterally from the base of the cylinder maintain it centrally disposed within the casing and hold the glass filler in spaced relationship to the casing wall.

It has also been the practice to bond a metal cup to the glass filler over the exhaust tip to protect it from accidental damage. When this is done a supporting member similar to the first described above is used to hold the filler in spaced relationship to the side and end walls of the casing.

These constructions have a number of serious disadvantages. Firstly, the support member is usually frictionally engaged with the side wall of the outer casing and remains in the casing when the filler is removed. Thus, if a filler becomes damaged and has to be replaced, the supporting member may not give adequate support to the new filler due to the fact that it may have been deformed by the constant pressure of the previous filler. Also, there is a slight variation in the length of fillers and this may further aggravate the problem since the previous filler may have been slightly longer than the replacement filler.

The use of a metal cup and a resilient supporting member is an expensive method since it requires two metal parts. The metal cup does not absorb any shocks which it may receive during handling and the filler is still subject to damage at this point.

The object of the present invention is to provide means for protecting the tip of the filler and supporting the filler in the casing which will not be subject to the disadvantages enumerated above. This object is attained by means of a combination tip protector and shock absorber having a substantially non-flexible flange adhered to the base of the filler around the exhaust tip and a flexible flange in abutment with the end wall of the casing.

The combination tip protector and shock absorber is made of a stiff, resilient, and locally-distortable material. Such material may conveniently be selected from the group including polyethylene, natural or synthetic rubber compounds, or polyvinyl copolymers. The combined tip protector and shock absorber is permanently adhered to the filler over the exhaust tip and has a deformable base which acts as a shock absorbing support for the filler in the casing.

More particularly the combination tip protector and shock absorber comprises a central portion having an internal cavity open at one end, a substantially non-flexible axially and radially outwardly projecting flange extending from the periphery of the opening at the end of the central cavity and a flexible axially and radially outwardly extending flange projecting from the periphery of the opposite end of the central portion.

The invention is defined in the appended claims when read in the light of the following description of the preferred embodiment. The invention is illustrated in the accompanying drawings in which like reference numerals denote the same parts in the various views and in which:

Figure 1:
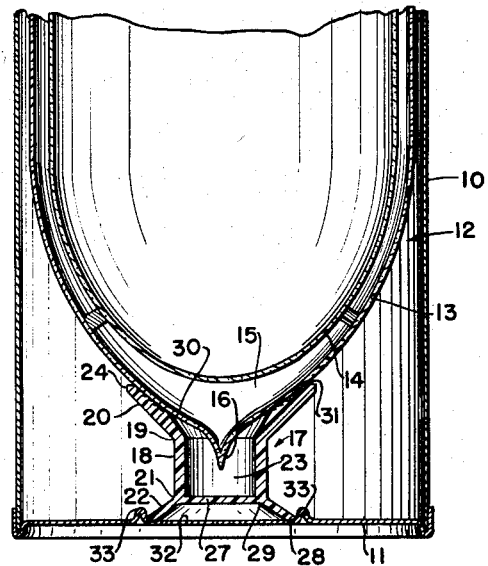
Fig. 1 is a fragmentary side view in cross-section of a combination tip protector and shock absorber in position in a vacuum bottle.

Referring now to the drawings a vacuum bottle is shown as consisting of an outer casing having a cylindrical side wall 10 and an end closure 11. The glass filler, shown generally at 12, is mounted within the casing and consists of an outer wall 13 and an inner wall 14 separated by an evacuated space 15. The exhaust tip formed at the base of the filler in the outer wall 13 is shown at 16. Through this tip 16 the air in space 15 is evacuated during the course of manufacture of the filler. This process is well known in the art and as it forms no part of the present invention, is not discussed further.

Figure 2:
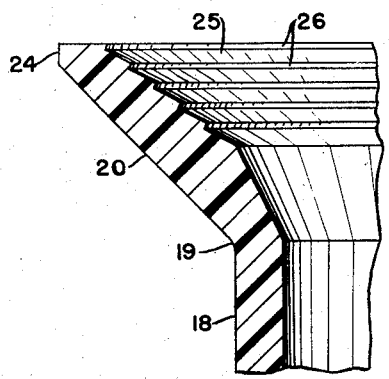
Fig. 2 is an enlarged view in cross-section of a portion of the combination tip protector and shock absorber of Fig. 1.
Figure 3:
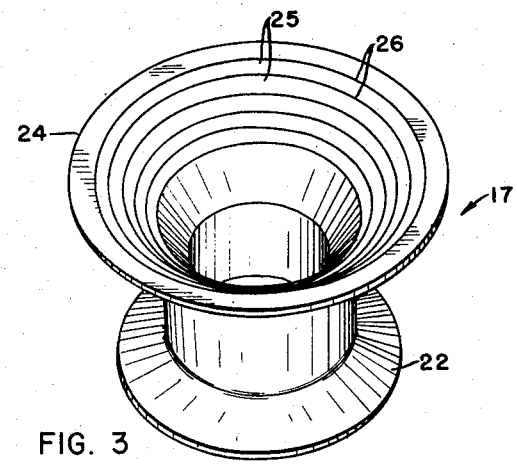
Fig. 3 is an enlarged perspective view of the combination tip protector and shock absorber of Fig. 1.

The combination tip protector and shock absorber 17, shown in cross-section in Figs. 1 and 2 and in perspective in Fig. 3, consists of a cylindrical centre portion 18 having at its upper end 19 an axially and radially outwardly extending annular frustro conical flange 20 and at its lower end 21 an oppositely directed axially and radially outwardly extending annular frustro conical flange 22. The central portion 18 is hollow having a central cavity 23 into which the exhaust tip 16 projects as can be seen in Fig. 1.

The flange 20 is moulded integrally with the centre portion 18 and is an extension of the annular side wall defining the cavity 23. The flange 20 is of tapering cross-section being thicker adjacent the end 19 of the centre portion 18 than at its edge 24. It is substantially non-flexible and on its upper face 25 it is provided with a roughened surface by means of undercuts, T-slots, a series of holes or a series of concentric rings as shown at 26 in the drawings.

A second annular flange 22 extends downwardly and outwardly from the periphery of the bottom wall 27 of the central cavity 23. Flange 22 is also of tapering cross-section although it is somewhat thinner than the upper flange 20. The flange 22 is thinner at edge 28 than at point 29 and at both points is thinner than is flange 20 at corresponding points and is designed to flex under pressure or sudden shock thereby providing a cushioned support for the glass filler.

The angle that the upper surface 25 of the upper flange 20 makes with the side wall of the central portion 18 is such that the surface 25 will conform to the surface 30 of the base of the filler 12 when the exhaust tip 16 is projecting into the cavity 23.

The combination tip protector and shock absorber 17 may conveniently be moulded from a stiff, resilient and locally-distortable material such as polyethylene. Other suitable stiff, resilient and locally-distortable materials may be used for the member 17 such as natural or synthetic rubber compounds or polyvinyl copolymers. The material chosen should maintain its physical properties through the normal range of atmospheric temperature.

The combination tip protector and shock absorber 17 is secured to the filler in the position shown in Fig. 1 by means of any suitable adhesive 31 such as rubber cement. The ribs or grooves 26 serve to assist the adhesive in gripping the member 17 and thus increase the bond between the two pieces. The combination tip protector and shock absorber 17 is secured to the glass filler 12 as the last step in the manufacturing process and is therefore present during all the subsequent handling and the assembly steps of the complete vacuum bottle to guard the tip from acidental breakage. If, during the use of the vacuum bottle, the filler becomes damaged and requires replacement, it is removed and discarded, the tip protector and shock absorber being discarded as well. The new filler will have its own new combination tip protector and shock absorber attached and may be simply inserted in the casing.

The end wall 11 of the outer casing may be provided with an annular rib 33 extending toward the filler 12. Alternatively the wall 11 may be formed with a central depression bounded by an annular side wall. When the filler is inserted in the casing and flange 22 is seated within this annular rib, pressure on the filler in the direction of the end wall 11 due to the tightening of an upper retaining cap (not shown) will cause the flange 22 to flex and spread outwardly. The annular rib 33 ensures that the base of the combination tip protector and shock absorber will remain centrally disposed with respect to the end wall and the filler will be held spaced from the casing side wall.

Since the flange 20 is of thicker cross-section than the flange 22, there will be substantially no flexing of flange 20 and hence insufficient relative movement between the surface 25 of flange 20 and surface 30 of the filler 12 to disturb the adhesive bond between these two surfaces. Due to its shape and thickness, the cylindrical portion 18 is, likewise, non-flexible and provides a firm, strong support. However, the resilient lower flange 22 will flex and provide a cushioning or shock absorbing support for the filler.

From the foregoing description it will be seen that the objects of the invention have been attained by the embodiment described. A simple and economical combination tip protector and shock absorber has been provided which may be permanently attached to a vacuum bottle filler to provide constant protection for the delicate exhaust tip. The combination tip protector and shock absorber is made of a non-corrosive material and since a new tip protector and shock absorber is provided with each filler, adequate support and protection is insured at all times.

While the invention has been described with reference to a specific preferred embodiment, minor modifications may be made therein without departing from the spirit of the invention as defined in the subjoined claims. It is to be understood that the terms such as "vacuum bottle" and "filler" are to have, in the claims, the same meaning as attributed to them in the specification.

I claim:

1. A vacuum bottle combination comprising an outer casing having a side wall and an end wall, a double-walled evacuated glass filler having an exhaust tip, said filler being mounted in the casing, means for retaining the filler in the casing and a combination one-piece tip proetctor and shock absorber molded from a stiff resilient and locally-distortable material, said combination tip protector and shock absorber having a hollow central portion of relatively thick section and relatively non-flexible, a first flange of relatively thick section and therefore relatively non-flexible integral with said hollow central portion and inclined axially and radially outwardly from one end thereof, said first flange being adhered to the base of the filler around the exhaust tip and said hollow central portion being of a length sufficiently great to extend a substantial distance beyond the outer end of the exhaust tip, and a second flange of substantially thinner section than both the hollow central portion and said first flange and therefore being relatively flexible, said second flange being integral with the end of said hollow central portion opposite the end from which said first flange extends and inclined axially and radially outwardly therefrom and engaging the end wall of the outer casing.

2. The combination of claim 1 in which the one-piece tip protector and shock absorber is molded from polyethylene.

3. The combination of claim 1 in which said first flange has a roughened upper surface to improve its adherence to the filler.

4. The combination of claim 1 in which the end wall of the outer casing has formed therein an inwardly extending ridge engaged by the outer end of the second flange of said tip protector and shock absorber to restrict relative movement between it and the casing end wall.

5. The combination of claim 1 in which the central portion of the tip protector and shock absorber has a bottom wall extending completely across the end thereof from which said second flange extends.

References Cited in the file of this patent

UNITED STATES PATENTS

| | | |
|---|---|---|
| 950,557 | Paalen | Mar. 1, 1910 |
| 2,324,253 | Anderson | July 13, 1943 |
| 2,446,966 | Switkart | Aug. 10, 1948 |
| 2,596,244 | Jacket | May 13, 1952 |
| 2,643,785 | Rust | June 30, 1953 |
| 2,713,435 | Venis | July 19, 1955 |

FOREIGN PATENTS

| | | |
|---|---|---|
| 485,501 | Great Britain | May 20, 1938 |
| 733,664 | Great Britain | July 13, 1955 |